(12) United States Patent
Victorov (10) Patent No.: US 7,937,693 B2
(45) Date of Patent: May 3, 2011

(54) SYSTEM AND METHOD FOR OBFUSCATION OF REVERSE COMPILED COMPUTER CODE

(75) Inventor: Victor Y. Victorov, St. Petersburg (RU)

(73) Assignee: 9Rays.Net, Inc., Alexandria, VA (US)

( * ) Notice: Subject to any disclaimer, the term of this patent is extended or adjusted under 35 U.S.C. 154(b) by 1251 days.

(21) Appl. No.: 11/537,273

(22) Filed: Sep. 29, 2006

(65) Prior Publication Data
US 2007/0256061 A1    Nov. 1, 2007

Related U.S. Application Data

(60) Provisional application No. 60/745,658, filed on Apr. 26, 2006.

(51) Int. Cl.
*G06F 9/45* (2006.01)
(52) U.S. Cl. ....................................................... 717/141
(58) Field of Classification Search .................. 717/141
See application file for complete search history.

(56) References Cited

U.S. PATENT DOCUMENTS 5,613,099 A * 3/1997 Erickson et al. ............. 719/315
7,150,003 B2 * 12/2006 Naumovich et al. ......... 717/108
2002/0034193 A1 * 3/2002 Patki et al. .................. 370/474
2003/0221121 A1 * 11/2003 Chow et al. .................. 713/200
2005/0044359 A1 * 2/2005 Eriksson et al. ............. 713/165

* cited by examiner

*Primary Examiner* — John Chavis
(74) *Attorney, Agent, or Firm* — Bardmesser Law Group (57) ABSTRACT

A method, system and computer program product for obfuscating pseudocode (e.g., p-code, IL-code, byte-code, etc.), including creating a class-container; declaring an anonymizer method in the class-container; identifying method call instructions in the pseudocode; replacing, in the pseudocode, method calls with calls of the anonymizer method; and in the anonymizer method, adding the method call instructions. All or some of the added method calls have the same name. Parameter types of the added calls can be replaced with an abstract type. Return types of the added calls can be replaced with an abstract type. The class-container is a global class, and includes calls to public method, or the class-container is a private nested class, and includes calls to private methods, or two separate class-containers can be used. Optionally, the invention can include identifying field load instructions in the pseudocode; replacing, in the pseudocode, field load instructions with calls of the anonymizer method; and in the anonymizer method, adding the field load instructions.

17 Claims, 6 Drawing Sheets

SYSTEM AND METHOD FOR OBFUSCATION OF REVERSE COMPILED COMPUTER CODE

CROSS-REFERENCE TO RELATED APPLICATIONS

This application is a non-provisional of U.S. Provisional Patent Application No. 60/745,658, filed on 26 Apr. 2006, entitled SYSTEM AND METHOD FOR OBFUSCATION OF REVERSE COMPILED COMPUTER CODE, which is incorporated by reference herein in its entirety.

BACKGROUND OF THE INVENTION

1. Field of the Invention

The present invention is related to obfuscation that prevents easy reverse engineering/decompilation of source code, and, more particularly, to obfuscation of source code that calls external libraries and classes.

2. Description of the Related Art

The nature of software renders it susceptible to analysis and copying by third parties. There have been considerable efforts to enhance software security, which have met with mixed success. Such security concerns relate to the need to prevent unauthorized copying of software and a desire to conceal programming techniques in which such techniques can be determined via reverse engineering.

Established legal avenues, such as copyright, provide a measure of legislative protection. However, enforcing legal rights created under such regimes can be expensive and time consuming. Further, the protection afforded to software under copyright does not cover programming techniques. Such techniques (i.e., the function as opposed to the form of the software) are legally difficult to protect. A reverse engineer could escape infringement by rewriting the relevant software based on a detailed knowledge of the function of the software in question. Such knowledge can be derived from analyzing the data structures, abstractions, and organization of the code.

Previous approaches to the protection of proprietary software have either used encryption-based hardware solutions or have been based on simple rearrangements of the source code structure. Hardware-based techniques are non-ideal in that they are generally expensive and are tied to a specific platform or hardware add-on. Software solutions typically include trivial code obfuscators, such as the Crema obfuscator for Java. Some obfuscators target the lexical structure of the application and typically remove source code formatting and comments and rename variables. However, such an obfuscation technique does not provide sufficient protection against malicious reverse engineering: reverse engineering is a problem regardless of the form in which the software is distributed. Further, the problem is exacerbated when the software is distributed in hardware-independent formats that retain much or all of the information in the original source code. Examples of such formats are Java bytecode and the Architecture Neutral Distribution Format (ANDF).

Software development can represent a significant investment in time, effort, and skill by a programmer. In the commercial context, the ability to prevent a competitor from copying proprietary techniques can be critical.

SUMMARY OF THE INVENTION

Accordingly, the present invention is related to a system and method for obfuscation of code that makes it difficult to reverse assemble such code, that substantially obviates one or more of the disadvantages of the related art.

In one aspect, there is provided a method, system and computer program product for obfuscating pseudocode (e.g., p-code, IL-code, byte-code, etc.), including creating a class-container; declaring an anonymizer method in the class-container; identifying method call instructions in the pseudocode; replacing, in the pseudocode, method calls with calls of the anonymizer method; and in the anonymizer method, adding the method call instructions. All or some of the added method calls have the same name. Parameter types of the added calls can be replaced with an abstract type. Return types of the added calls can be replaced with an abstract type. The class-container is a global class, and includes calls to public method, or the class-container is a private nested class, and includes calls to private methods, or two separate class-containers can be used. Optionally, the invention can include identifying field load instructions in the pseudocode; replacing, in the pseudocode, field load instructions with calls of the anonymizer method; and in the anonymizer method, adding the field load instructions.

In another aspect, there is provided a method, system and computer program product for obfuscating pseudocode, including creating a class-container; identifying methods that need to be stubbed; for each identified method, declaring a stub method in the class-container; copying bodies of the identified methods to their corresponding stub methods; removing the bodies from the original identified methods; adding, to each of the identified methods, a call to its corresponding stub method. Parameter types of the stub methods can be replaced with an abstract type. Return types of the stub methods can be replaced with an abstract type.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIGS. 1 and 2 show how tokens are used to anonymize methods, parameter types and return types.

DETAILED DESCRIPTION OF THE PREFERRED EMBODIMENTS

Reference will now be made in detail to the embodiments of the present invention, examples of which are illustrated in the accompanying drawings.

The objective of obfuscation software (sometimes known as "anonymizer" software) is to render the code as meaningless to visual review as possible, and to force the hacker, or reverse engineer, to invest an inordinate amount of time into figuring out how the code is structured, and what the individual fragments and function calls of the code actually do. The greater the burden on the hacker, and the more labor intensive and time consuming the process, the less likely will be an appearance of a clone product based on a reverse assembly approach. Furthermore, even if such a clone product does eventually appear, there is a much higher probability that by the time it hits the market, a new version of an "honest" product from a legitimate software publisher will be on the market, rendering demand for the clone of the old version minimal.

One particular difficulty in the field of obfuscation lies with source code that is assembled into .NET architecture-compatible code. This is to a large extent due to the fact that many of the function calls and objects are so-called public classes, public libraries and public methods, which means that these classes have to be invoked using their "real" names, as opposed to meaningless names. An example of such calls and methods is the well-known concatenation method, which takes two strings as an input, and combines them into a single string. The "concat" method is a public method, and any invocation of the concat method needs to use that exact term—e.g., concat (string1, string2, output string). The use of such public methods and classes in .NET make the job of obfuscating the code much more difficult. Also, a simple replacement of class and method names with less meaningful names will rarely be effective in fooling a hacker, particularly where tools are available that can global-replace "meaningless names" with "meaningful names."

The approach described herein relies on a .NET artifact called "tokens" for anonymization. In the remainder of this discussion, it will be assumed that the reader is familiar generally with the concept of .NET architecture, .NET metadata, and the architecture of .NET classes and methods. The use of the tokens permits dispensing with the use of class names and parameter names, replacing them with essentially meaningless class objects, as far as the hacker is concerned.

Figure 1:
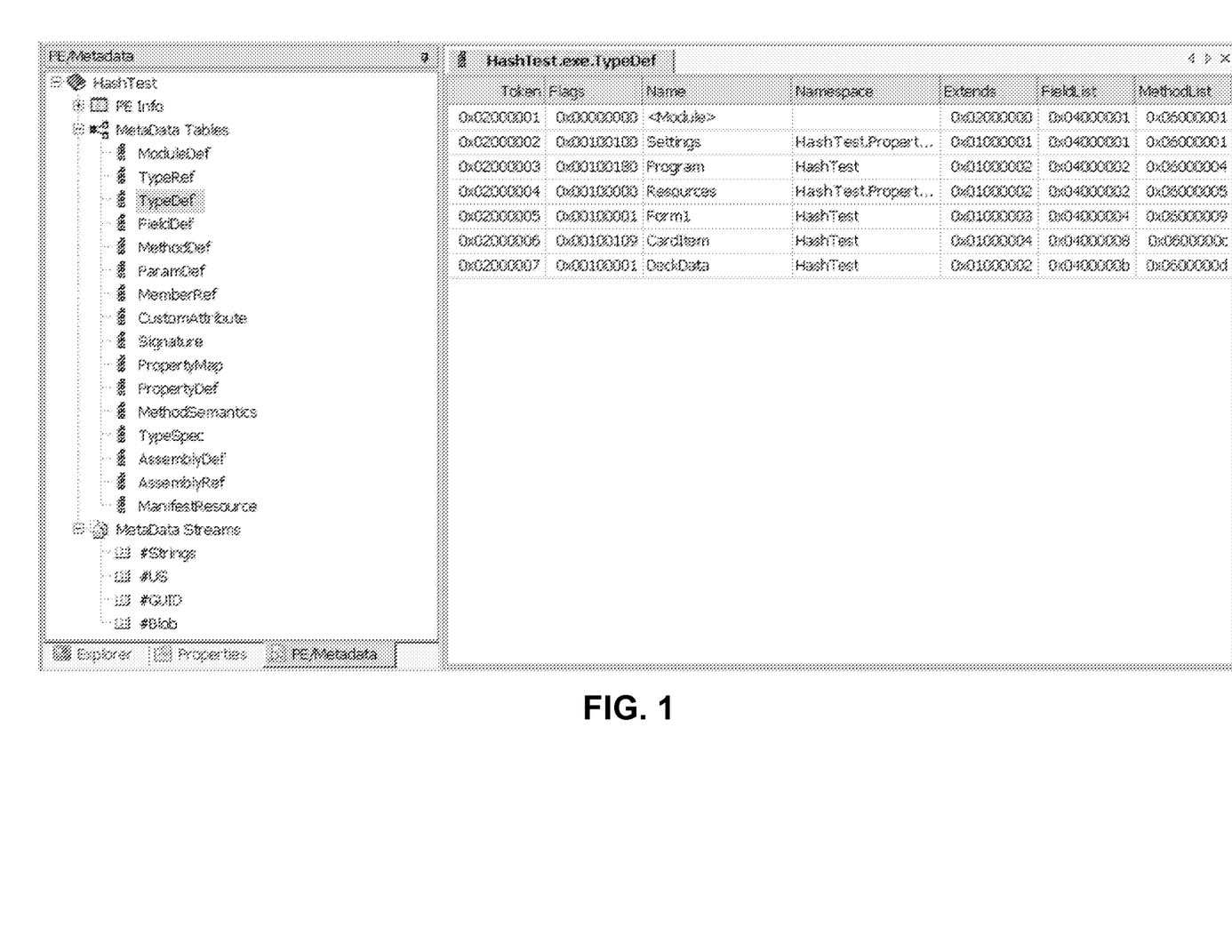

FIG. 1 illustrates the aspect of .NET architecture that is particularly relevant to the present discussion, specifically, the structure of the metadata, and how tokens fit in with the present discussion. FIG. 1 illustrates the internal structure of the metadata of one exemplary class. In FIG. 1, on the left upper portion is the table, which includes the metadata values themselves, and streams on the lower left, which are used for handling unstructured data. (An older term for the unstructured data is "heap.")

In this example, HashTest is the name of the assembly. The PEInfo element of the metadata refers to the executable files. Metadata tables is a set of tables that stores structured information about the assembly.

ModuleDef (module definitions) contains the name of the module, and its properties (typically a single line). TypeRef (type references) contains the references to external types, which are not part of this assembly, however, this assembly refers to those types, even though they are external.

TypeDef (type definitions) is a list of classes that are part of this assembly. TypeDef (type definitions) and FieldDef (field definitions) defines the types and fields for the classes specified in TypeRef.

ParamdDef describes the listings of parameters used in MethodDef. MemberRef includes references to methods and fields of external classes (described in TypRef). CustomAttributes is a table that lists attributes declared (or attached to) different assembly members (AssemblyDef, TypeDef, MethodDef, FieldDef, PropertyDef, EventDef, ParamDef).

Signature is an encoded sequence of bytes, which, after decoding, contains additional information about the assembly member—such as return type, parameter types of method, field type, property type, event type.

PropertyMap and PropertyDef are two tables that should be viewed together. PropertyMap refers to properties of the types defined in TypeDef. PropertyDef defines the type for the methods of the MethodDef table. An example of a property is the length of a line (in symbols) displayed on a monitor. The length may be predefined, therefore, it can be "gettable," but not "settable." MethodSemantics is a table relating to events that a method can either trigger, or can respond to. In other words, this table defines what the method does either with properties or with events.

TypeSpec is a table used for creation of complex classes. As one example, a line consists of symbols. Multiple lines displayed on a screen can be defined as a type, which in turn consists of several types (lines, symbols, etc.).

AssemblyDef and AssemblyRef are items in a similar category as TypeRef and MemberRef. AssemblyDef contains information about the current assembly—such as its name, signatures, etc. AssemblyRef is a list of assemblies, used in this assembly. AssemblyRef, TypeRef, MemberRef are tables that refer to various structures, divided into different hierarchies. ManifestResource is a table of various items that are essentially dead weight for most of the program's execution—such as welcome screen graphics, company logos, etc.—in other words, items that are displayed perhaps once at the program's initialization or installation, or displayed and/or used very rarely. Typical items are things like jpegs, company logos, flash presentations, video displayed only rarely, etc.

Metadata Streams refers to unstructured data—such as string data, binary data, etc. Such data is normally placed into a heap, and can include strings (line information stored in the metadata tables), user strings (line information used in the methods), blob (binary information used in the metadata tables), GUIDs (global unique identifiers used in the metadata tables).

Note that the present invention is not limited to this particular metadata structure, rather, the .Net metadata architecture is used for illustration purposes only.

On the right half of FIG. 1 is the contents of the table TypeDef, which illustrates how tokens are used in .NET assemblies. It should be noted again that the assemblies utilize tokens, not names of classes and methods, as is known to one familiar with .NET architecture. The first column on the right hand side is the token column. In this case, the tokens all refer to table entries in the TypeDef table, which is Table 2. Note that the count starts at zero, and the token values, as displayed, are in hexadecimal. Further note that some of the tables on the left hand side are empty, and are therefore not displayed in this screenshot. The TypeDef table is Table 02, the FieldDef table is Table 04, and the MethodDef table is Table 06.

Further with reference to the right hand side of FIG. 1, considering the token 02000002, this token corresponds to the type that has a name "Settings." It is found in the class HashTest.Properties. The type inherits from the class found at 01000001 (see the column called "Extends"). The field list column, with the token 04000001, identifies where in the FieldDef table the fields for this type start. In the method list column, the token 06000001 identifies the methods corresponding to this type, in the MethodDef table. Note that this type ("Settings") has only a single field in the FieldDef table, but has three methods that correspond to it.

FIG. 2 illustrates the content of the MethodDef table, in this example (note the highlighting of the MethodDef on the left). Again, on the right hand side, there is a list of tokens. Each token starts with a 06, meaning, it is related to the MethodDef table. The next column of primary interest here is the RVA, or the virtual address column. This field represents an offset address in a file (in hexadecimal), which identifies where the body of the method is actually found. For example, for the token 06000004, the body of the method is found between the offset addresses 00002075 and 0000208C-1 (i.e., 0000208B, in hexadecimal).

Thus, with this discussion in mind, it becomes apparent why, when obfuscating IL code, it is possible to dispense with using method names, class names, and parameter names, since internal .NET architecture does not rely on such artifacts, but instead uses tokens. It will be appreciated, of course, that with enough patience and enough dedication to the task, a hacker could trace through the relevant metadata tables, and ultimately figure out what the obfuscated code does and how it is structured. However, this is an extremely labor intensive task, made more difficult by a lack of any user-friendly naming convention for the methods and classes. Thus, by the time a hacker finally figures out how to reverse assemble the code and how the code is structured and functions, the publisher will be issuing a new version of the software, staying one step ahead of the hackers.

The obfuscator, on the basis of user-specified options, scans method bodies that contain, in .Net builds, an intermediate language code—IL code, searching for calls of other methods (class methods) or loads of class fields. As soon as a method call or a field load is detected, the obfuscator creates a special class wrapper (stub), which will contain method bodies—stubs for the scanned class. This class is inserted into the scanned class as a nested class. In other words, the class containing the stubs of method calls is nested in the protected class. In this class, a stub method is created, which, in effect, contains a call (or load) of the actual method. In the scanned method body, a real call or a "real" field load is replaced by calling the stub method.

Additionally, the stub method itself is preferably disguised as follows:

(1) If possible, the return type of the method is disguised.
(2) Information about the types of parameters passed into the method is disguised.

During the obfuscation process, some public class members remain unobfuscated, i.e., their names are intact and thus reflect the essence of the method, displaying what it does. The obfuscator also creates a stub for such methods (on the same principles), replacing the non-obfuscated method body with a call of the stub method, and the "real" method body (i.e., the functional method code) is moved to the stub method. Also, when method bodies are scanned, all calls of a non-obfuscated method are replaced by calling the stub method.

The following mechanisms can be used for anonymizing methods:

(1) Each stub method has the same name. This complicates reverse engineering of the protected method, as all method calls have the same names.
(2) Information about parameter types and return types is disguised. Wherever possible, the information about method return type and the types of parameters passed into the method is anonymized by replacing a real type (e.g., string, integer, etc.) with object type (system object). This measure prevents identification of real types of data passed to and returned by the stub method.

This is the source IL code example relating to the concatenation method:

```
IL_0000: ldstr "Test1:"
IL_0005: ldarga.s
IL_0007: call instance string [mscorlib]System.Int32::ToString( )
IL_000c: call string [mscorlib]System.String::Concat(string, string)
IL_0011: call void [mscorlib]System.Console::WriteLine(string)
```

And this is obfuscated concatenation method IL code:

```
IL_0000: call class object smallTest.-::2( )
IL_0005: ldarga.s
IL_0007: call class object smallTest.::5(class object)
IL_000c: call class object smallTest.::2(class object, class object)
IL_0011: call void smallTest.::7(class object)
```

Notice that calls to Int32.ToString( ), String.Concat and System.Console.WriteLine methods are anonymized, which means:

(1) Method execution flow is made unclear;
(2) Method is executed through an anonymized wrapper (stub) that uses an anonymized parameter list;
(3) Method return type is anonymized, so that it is very difficult now to understand what this method returns.

Internal calls can be anonymized as referenced, unless the assembly members are marked by the developed to be excluded during the obfuscation.

String encryption anonymization lets the user hide methods that load and decrypt string data. This is a type of anonymization used to anonymize calls that are inserted by the obfuscator to encrypt code lines, to prevent the disassembler from using a simple mechanism to reverse engineer this call—if the disassembler sees a method that returns a type string, then it might be a decryption function. On the other hand, if the method is anonymized to return class object instead of string, there is no easy way to determine that this is a decryption function. Several decompilers can trace decryption code and so retrieve the original string data. The obfuscator hides information about parameters and returned data, and therefore prevents decompilers from generating correct and readable code.

Note: Additional precautions prevent so-called disassembling round-trips, when ILDASM code listing is used to create an assembly copy with ILASM. ILASM is an assembly linker that permits, from a listing generated by IL disassembler (ILDASM), to generate a copy of the assembly. Round-trip permits the hacker to disassemble the assembly, correct (edit) the code by removing the protection mechanism, and re-assemble the assembly without any protection. Inclusion of methods with identical names in the listing will make it impossible for the hacker to reassemble it—identical method names will generate an assembly error.

The obfuscator lets the user replace unobfuscated methods with anonymized stubs. Here is a sample code:

```
public bool PrintMessage(string msg)
{
  System.Console.WriteLine(msg);
}
//---- usage ------
if (PrintMessage(Hello!))
{
}
```

Here is the above function after anonymization:
```
public bool PrintMessage(string msg)
```

-continued

```
{
  0(msg);
}
internal void 0(object a_0)
{
  System.Console.WriteLine(a_0);
}
//---- usage ------
if (0(s.1( ))
{
}
```

Notice the following points:

(1) PrintMessage method is replaced with 0 method.

(2) References to this method are also replaced in other calling methods.

(3) Referenced members anonymization also affects method 0 body.

The fragment of C code below will be used to illustrate some of the principals of obfuscation, as discussed herein. The fragment of code is written in C, which is one of the common languages used for programming today, although it would be understood that the invention is not limited to any particular programming language. However, all modern languages, such as C, C++, Java, etc. support the concepts of objects, classes, etc.

In the C code fragment below, a public class called "Test" is defined. Nested within the public class Test is another public classed called "DataHolder." In this example, DataHolder is essentially a container for transferring data within the program, and may be thought of as a helper class.

Two public methods are defined, one called Output, and one called HelloWorldTest. The method Output is intended to essentially write a string to an output device, such as a screen, and return a numeric value as the return parameter. The public method HelloWorldTest places the string "HelloWorld!!!" into the DataHolder (so that it can be subsequently printed by the public method called output). This example, although somewhat simplified and not very useful in a real-world sense, is nonetheless useful for illustrating the principles of obfuscation.

If the source code at issue needs to be compatible with .NET architecture, the C code above needs to be converted to what is known as "intermediate language," or IL. The listing below is an example of what the C code looks like, when converted to IL format.

```
public namespace smallTest
{
  class Test
  {
    public class DataHolder
    {
      private string msg;
      private int count;
      public DataHolder(string msg, int count)
      {
        this.msg = msg;
        this.count = count;
      }
      public string Message
      {
        get {return msg;}
      }
      public int Count
      {
        get {return count;}
      }
    }
    public void HelloWorldTest( )
    {
      DataHolder dh = new DataHolder("Hello World!!!", 4);
      Output(dh);
    }
    public int Output(DataHolder dh)
    {
      System.Console.WriteLine(string.Format("{0}. {1}", dh.Count-
  .ToString( ),
  dh.Message));
      return dh.Count;
    }
  }
}
```

The above C code is converted to IL code as follows (below is only the IL code for Output method):

```
.method public hidebysig instance int32 Output(class smallTest.Test/DataHolder dh) cil managed
{
  // Code size: 46 bytes
  .maxstack 4
  .locals ([0] int32 V_0, [1] int32 V_1)
  IL_0000: ldstr "{0}. {1}"
  IL_0005: ldarg.1
  IL_0006: callvirt instance int32 smallTest.Test/DataHolder:: get_Count( )
  IL_000b: stloc.1
  IL_000c: ldloca.s V_1
  IL_000e: call instance string [mscorlib]System.Int32:: ToString( )
  IL_0013: ldarg.1
  IL_0014: callvirt instance string smallTest.Test/DataHolder::get_Message( )
  IL_0019: call string [mscorlib]System.String::Format(string, class object, class object)
  IL_001e: call void [mscorlib]System.Console:: WriteLine(string)
  IL_0023: ldarg.1
  IL_0024: callvirt instance int32 smallTest.Test/DataHolder:: get_Count( )
  IL_0029: stloc.0
  IL_002a: br.s IL_002c
  IL_002c: ldloc.0
  IL_002d: ret
}
```

In the above IL code, particular attention should be paid to the bold lines (IL code lines 0, 6, E, 14, 19, 1E and 24). For a reverse engineer or a hacker, such bolded IL code is a telltale indicator of what the purpose of the code fragment is—by looking at the class names, parameter names and parameter types, an experienced hacker will very quickly figure out what this code fragment is intended to do and can quickly reverse assemble such code. Therefore, the task of the obfuscator is to strip out, from the IL code, as much of such readily-apparent information as possible, rendering the code virtually unreadable (but nonetheless still functional). Furthermore, the IL code above is only the method Output, not the entire code fragment—nevertheless, the IL code in the form above is readily understandable by any experienced reverse engineer or hacker.

The code below therefore needs to be compared line by line with the unobfuscated code above, to see how much less readable (and in reality, virtually unreadable) such IL code listing becomes. It should also be remembered that this example is very small and compact, dealing with only a handful of function calls and methods. In any real world situation, there are hundreds, if not thousands of such objects and methods in most code listings. For a hacker, reverse engineering even a function as simple as the Output function above becomes an unpleasant exercise—for large code listings, there is a statistical effect where the amount of manual labor needed for disassembly and reassembling of such obfuscated code becomes simply insurmountable.

Below is IL code for Output with some parameter types unobfuscated:

```
.method public hidebysig instance int32 Output(class smallTest.Test/DataHolder dh) cil managed
{
  // Code size: 46 bytes
  .maxstack 4
  .locals ([0] int32 V_0,
     [1] int32 V_1)
  IL_0000: call class object 0.-::□( )
  IL_0005: ldarg.1
  IL_0006: call int32 smallTest.Test/?::?(class object)
  IL_000b: stloc.1
  IL_000c: ldloca.s V_1
  IL_000e: call string smallTest.Test/?::?(class object)
  IL_0013: ldarg.1
  IL_0014: call string smallTest.Test/?::?(class object)
  IL_0019: call string smallTest.Test/?::?(string, class object, class object)
  IL_001e: call void smallTest.Test/?::?(string)
  IL_0023: ldarg.1
  IL_0024: call int32 smallTest.Test/?::?(class object)
  IL_0029: stloc.0
  IL_002a: br.s IL_002c
  IL_002c: ldloc.0
  IL_002d: ret
}
```

As will be seen from comparing the IL code before obfuscation, and IL code after obfuscation, all the function calls have been replaced with essentially meaningless names. For instance, comparing line 0 before obfuscation, and line 0 after obfuscation, the load string function (which is quite readable to a hacker) has been replaced with a meaningless class call (call class object "0.-::□(''). To make the life of a hacker even more difficult, the class name can be obfuscated even further by using unprintable characters, or characters from uncommon languages that are nonetheless supported by modern systems—for example, instead of using Latin characters, Arabic or Farsi characters can be used, or Japanese, etc.—this makes the obfuscated code even more difficult for the hacker to comprehend.

Comparing the remainder of the bolded lines between the unobfuscated code and the obfuscated code, it will be seen that other function calls have been replaced by the same call—"call string SmallTest.test/?::? (class object)". Note that in line 19 of the code, one of the parameters is still identified as string type. Similarly, in line 1E, the parameter type is still identifiable as a string. In other words, this code has been obfuscated, but not to the maximum degree that is theoretically possible.

Note also that in the obfuscated code, it is impossible to tell what the arguments of the methods are, and what are the types of arguments—all of the arguments are class objects, which is essentially meaningless, without considerable further manual research.

Also note that within the class "test," another nested class is created, called DataHolder, which is essentially a container used for anonymization. In other words, the "test" class is essentially a wrapper, and inside the wrapper, in a typical scenario, there will be hundreds of such nested methods.

Also, it is useful to compare lines E and lines 14 in the obfuscated code (which are identical in the obfuscated code) with lines E and 14 prior to obfuscation—as will be readily seen, prior to obfuscation, these two lines refer to completely different function calls.

Furthermore, it should be remembered that in the .NET architecture, there are strict requirements on stack size, and therefore, some restrictions on the number of parameters passed to the anonymization methods, and anonymization stubs.

The obfuscated IL code below is an example of where even the string type parameters have been anonymized from the method Output—this may be seen when comparing code lines 19 below with code line 19 above—all references to string types have been anonymized to class object—rendering the code even more meaningless to a hacker.

```
.method public hidebysig instance int32 Output(class smallTest.Test/DataHolder dh) cil managed
{
  // Code size: 46 bytes
  .maxstack 4
  .locals ([0] int32 V_0,
     [1] int32 V_1)
  IL_0000: call class object 0.-::?( )
  IL_0005: ldarg.1
  IL_0006: call int32 smallTest.Test/¢::?(class object)
  IL_000b: stloc.1
  IL_000c: ldloca.s V_1
  IL_000e: call class object smallTest.Test/¢::?(class object)
  IL_0013: ldarg.1
  IL_0014: call class object smallTest.Test/¢::?(class object)
  IL_0019: call class object
  smallTest.Test/¢::?(class object, class object, class object)
  IL_001e: call void smallTest.Test/¢::?(class object)
  IL_0023: ldarg.1
  IL_0024: call int32 smallTest.Test/¢::?(class object)
  IL_0029: stloc.0
  IL_002a: br.s IL_002c
  IL_002c: ldloc.0
  IL_002d: ret
}
```

The example below illustrates what the reverse compiled code will look like, when reverse compiled back into the C code—in other words, comparing the original C source code of the function Output, which is as follows:

```
public int Output(DataHolder dh)
{
  System.Console.WriteLine(string.Format("{0}. {1}",
dh.Count.ToString( ), dh.Message));
  return dh.Count;
}
```

With the reverse compiled C code after obfuscation:

```
public int Output(smallTest.Test.DataHolder dh)
{
  smallTest.Test.¢.?(
    smallTest.Test.¢.?(0.-.?( ),
    smallTest.Test.¢.?(smallTest.Test.¢.?(dh)),
    smallTest.Test.¢.?(dh)));
  return smallTest.Test.¢.?(dh);
}
``` it will be seen that at least based on visual inspection, the job of the hacker trying to figure out what the function Output was doing will be extremely challenging, and more importantly, extremely labor intensive.

Notice that calls to Int32.ToString( ), String.Format, System.Console.WriteLine methods are anonymized, with the following benefits:

(1) Anonymized methods have identical (same) names;
(2) Method execution flow made unclear;
(3) Object creation is anonymized;
(4) Method is executed through an anonymized wrapper (stub) that uses anonymized parameters list;
(5) Method return types anonymized, so that it is very difficult now to understand what this method returns.

Private calls can be anonymized just as referenced—to anonymize these calls, a class-container is created as a private nested class, to which the method being scanned belongs. This is done in order to avoid violating security of the calls. Note also that the container class can be created as a new class, or one of the existing classes can also be used—as such, "creating" a container class, and designating an existing class as a container is equivalent.

Below is the source IL code example for the HelloWorldTest method (see original C code fragment above):

```
.method public hidebysig instance void HelloWorldTest( ) cil managed
{
  // Code size: 21 bytes
  .maxstack 3
  .locals ([0] class smallTest.Test/DataHolder dh)
  IL_0000: ldstr "Hello World!!!"
  IL_0005: ldc.i4.4
  IL_0006: newobj instance void smallTest.Test/ DataHolder::.ctor
  (string,
    int32)
  IL_000b: stloc.0
  IL_000c: ldarg.0
  IL_000d: ldloc.0
  IL_000e: call instance int32
  smallTest.Test::Output(class smallTest.Test/DataHolder)
  IL_0013: pop
  IL_0014: ret
}
```

This is obfuscated HelloWorldTest IL code, without anonymizing parameter types:

```
.method public hidebysig instance void HelloWorldTest( ) cil managed
{
  // Code size: 21 bytes
  .maxstack 3
  .locals ([0] class smallTest.Test/DataHolder V_0)
  IL_0000: call class object 0.-::?( )
  IL_0005: ldc.i4.4
  IL_0006: call class smallTest.Test/DataHolder
  smallTest.Test/„::_(string, int32)
  IL_000b: stloc.0
  IL_000c: ldarg.0
  IL_000d: ldloc.0
```

And this is IL code that is fully obfuscated, including anonymization of parameter types:

```
IL_000e: call int32 smallTest.Test/,,::_(class object,
class smallTest.Test/DataHolder)
IL_0013: pop
IL_0014: ret
}
```

```
.method public hidebysig instance void HelloWorldTest( ) cil managed
{
  // Code size: 21 bytes
  .maxstack 3
  .locals ([0] class smallTest.Test/DataHolder V_0)
  IL_0000: call class object 0.-::?( )
  IL_0005: ldc.i4.4
  IL_0006: call class object smallTest.Test/_::☐(class object, int32)
  IL_000b: stloc.0
  IL_000c: ldarg.0
  IL_000d: ldloc.0
  IL_000e: call int32 smallTest.Test/_::☐(class object, class object)
  IL_0013: pop
  IL_0014: ret
}
```

Below is C# code that is reverse-assembled from the above IL code (note the meaningless class name smallTest.Test and the meaningless method-anonymizer "¢.?":

```
public void HelloWorldTest( )
{
  smallTest.Test.¢.?(this, smallTest.Test.¢.?(0.-.?( ), 4));
}
```

The obfuscator can replace unobfuscated methods with anonymized stubs. This is another example (here, "1." is the declaration of the method and its body in the curly brackets { }, and "2." is the example of code calling this method):

```
1.
public bool PrintMessage(string msg)
{
  System.Console.WriteLine(msg);
}
2.
//---- usage ------
if (PrintMessage("Hello!"))
{
  //...
}
```

Here is the above code after anonymization, that shows the resulting anonymized code:

```
public bool PrintMessage(string msg)
{
  smallTest.Test.¢.?(msg);//call anonymizer stub
}
//anonymizer stub in smallTest.Test.¢
internal void ?(object a_0)
{
  System.Console.WriteLine(a_0);
}
//--------------------------------------
//---- usage ------
if (smallTest.Test.¢.?(0.-.?( )( ))
{
  //....
}
```

Notice the following points:
(1) PrintMessage method is replaced with 0 method.
(2) References to this method are also replaced in other calling methods.
(3) Internal calls to PrintMessage referenced to PrintMessage stub directly.
(4) Referenced members anonymization also affects method 0 body.

Anonymized code performance can be somewhat lower than that of the original code. Assembly performance, IL-code performance can be somewhat lower because of anonymization specifics. Anonymizing code critical to performance should be carefully considered.

Note also that class object is the root class or the other objects, which is one reason why it is advisable to use it for anonymization of parameters and return types. Note also that parameter type anonymization, and return type anonymization can be done either together or separately, although, as noted earlier, for the maximum possible obfuscation effect, both the parameter types and the return types should be anonymized.

Furthermore, it is worth noting the distinction in how .NET handles value types and reference types as parameters. A reference type parameter (e.g., string type) is essentially a pointer to a location in memory where the value of the parameter is stored. Anonymizing reference types is generally easier than anonymizing value types. A value type is, using somewhat older terminology from PASCAL or PL/1, a data record, or a data structure. Because of stack size restrictions, and different lengths of the value type variables that can be passed to the methods, anonymizing these is more difficult, and may be skipped altogether. One way to anonymize them is to create a separate class type for each one, although this tends to be somewhat overhead-intensive.

Figure 3:
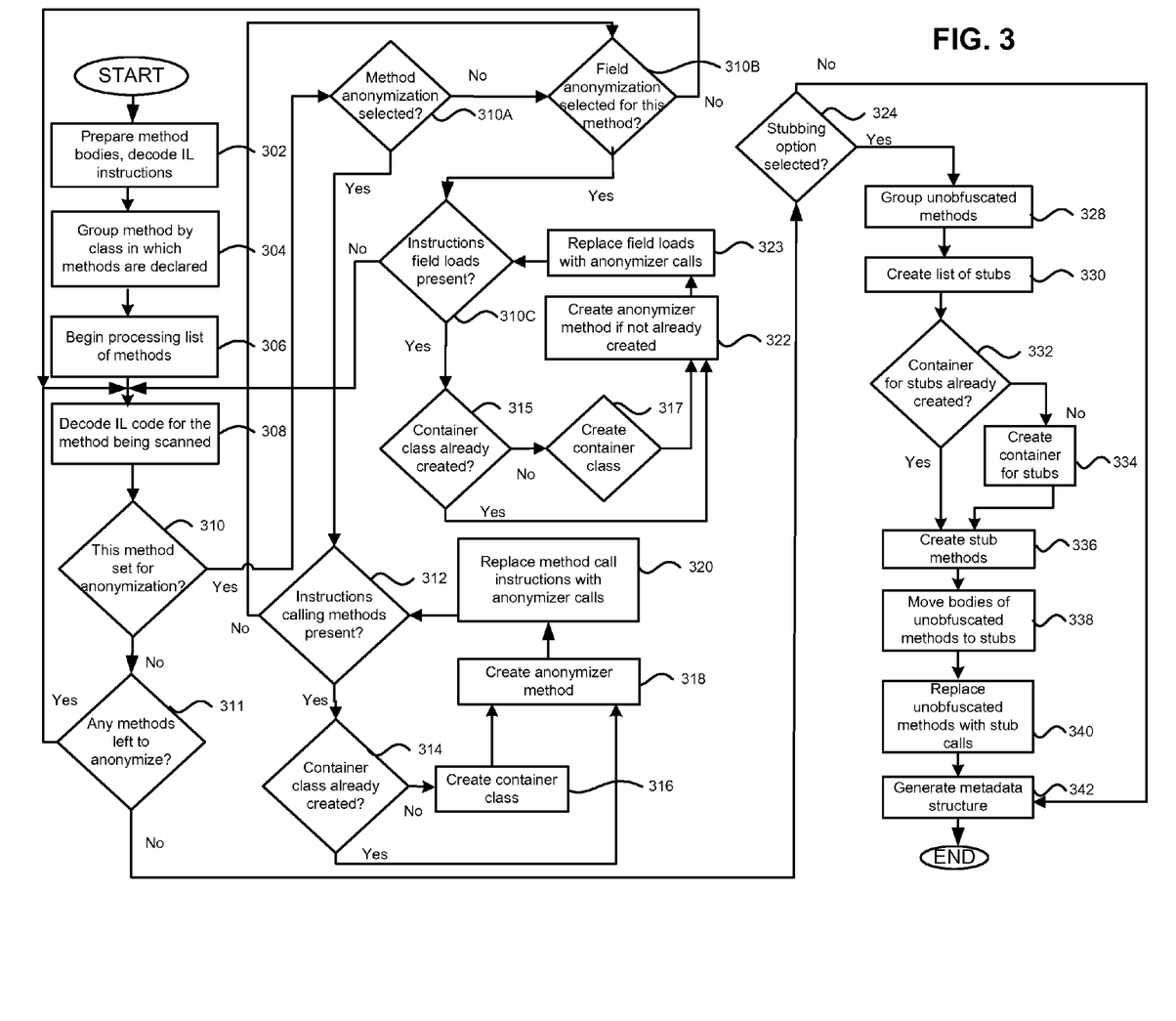
FIG. 3 illustrates an exemplary method of the invention in flow chart form.
Figure 4:
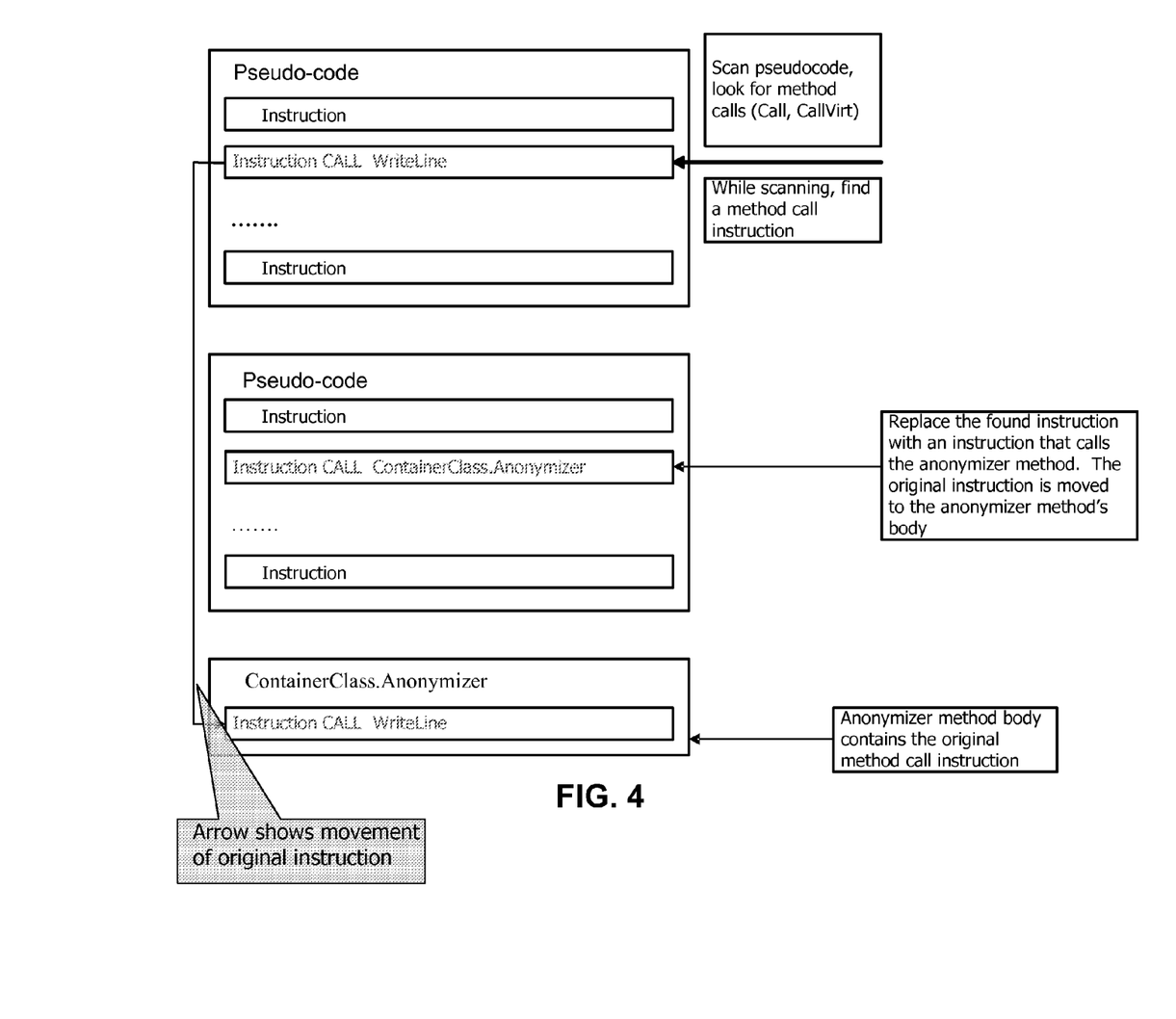
FIGS. 4-6 illustrate an exemplary method of the invention in block diagram form.
Figure 5:
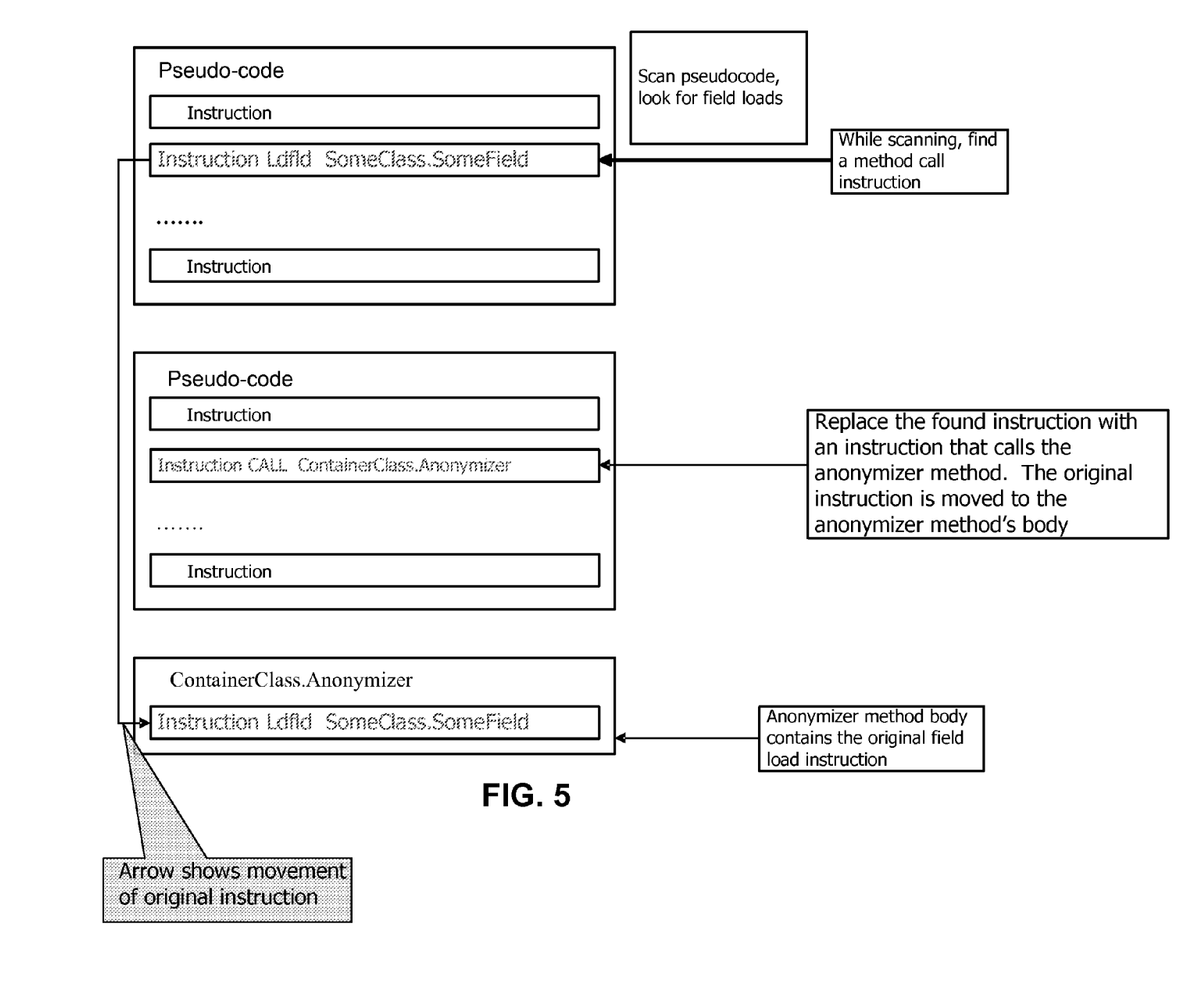
Figure 6:
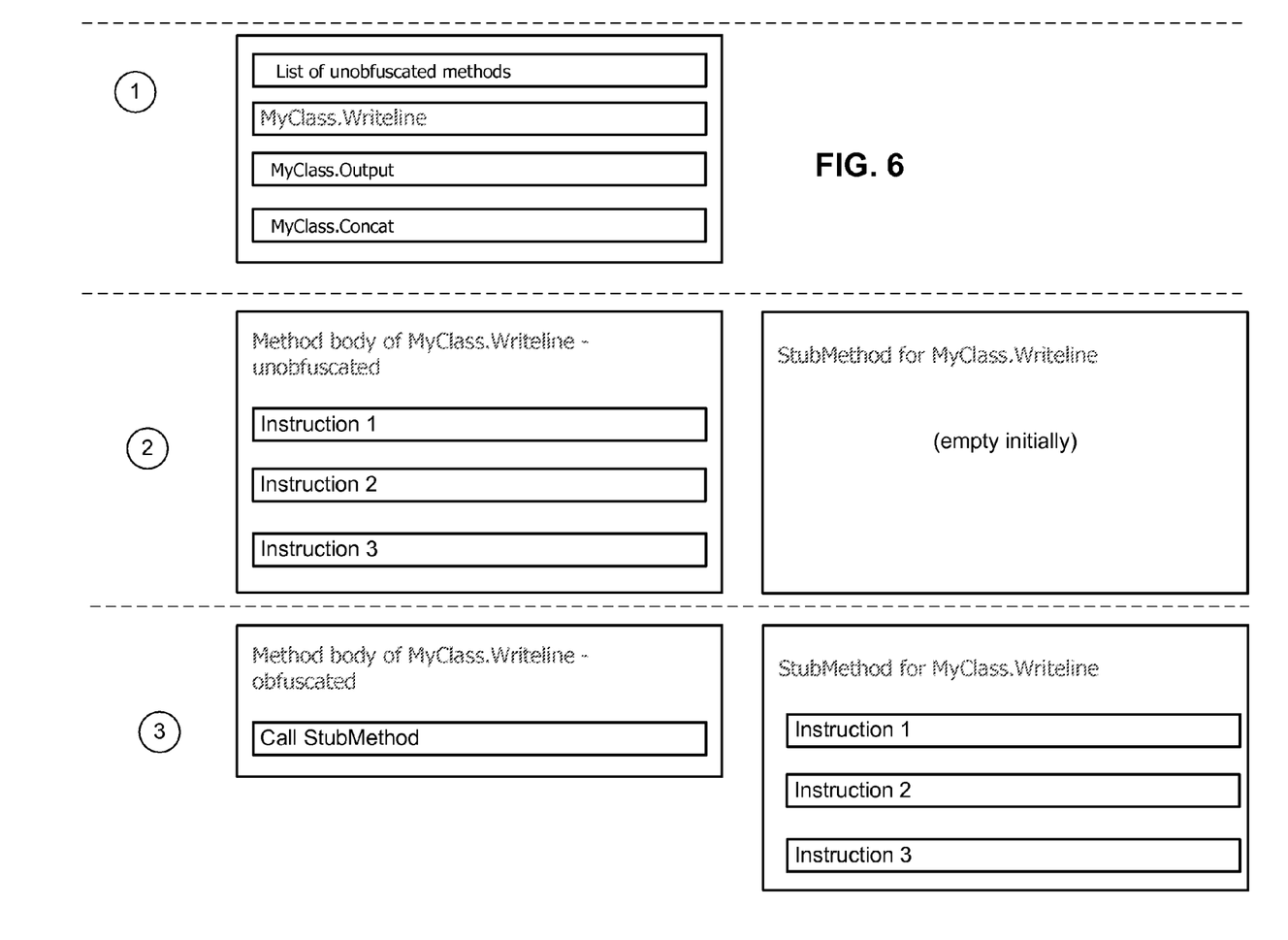

FIG. 3 is a flowchart illustrating the anonymization method according to one embodiment of the present invention. As shown in FIG. 3, in step 302, the method bodies are prepared, and the IL code instructions are decoded. In step 304, the methods are grouped according to the class in which they are declared. In step 306, the list of groups is processed as follows:

In step 308, the IL code of the method being scanned is generated (in essence, this is a list of IL code instructions being processed or scanned).

In step 310, if the referenced methods are set for anonymization, or if the internal methods are set for anonymization, then, in step 310A, the obfuscator checks if method anonymization is selected. If it is not, then, in step 310B, the obfuscator checks if field anonymization is selected for this method. If this method has field anonymization selected, then, in step 310C, the obfuscator checks if there are field load instructions present. (Otherwise, the obfuscator returns to step 308.) If, in step 315, a container class has not yet been created, then, in step 317, the container class is created. In step 322, an anonymizer method is created, if it hasn't already been created. In step 323, field loads are replaced with anonymized calls.

After step 310A, if this method is selected for anonymization, then, in step 312, each instruction is analyzed for the presence of a method called instruction (such as call, new object, callvirt). In step 314, if such an instruction is found, the anonymizer checks if the container for the anonymization methods already exists. In step 316, if it does not exist, then the container is created based on the following principal column if the method is public, then create a general container for anonymization of the public methods; if the method is not public, then a container class is created as a nested class inside the class within which the method is declared.

In step 318, the anonymizer method is created. In step 320, the instruction that needs to be anonymized (e.g., a method call, a load field instruction) is replaced by a call of the anonymizer method.

If the referenced fields or internal fields anonymization setting is selected, then, in step 322, each instruction is analyzed for referring to a field of the class (such as LdFld, LdsFld). Also, a special anonymizer method is created, which replaces the original method call, and hides the "real" call inside itself.

If the setting to leave the methods untouched is selected, or, in step 311, there are no more methods to anonymize, then the obfuscator is ready create stubs, in step 324. In step 328, the grouping of the unobfuscated (untouched) methods is done. For these methods, the stubs will need to be created, as classes—a method cannot exist by itself, but must belong to some class, i.e., must be declared in that class. Thus, it is necessary to create a special class-container for these methods, so that the newly "created" method can be declared there. Since some of the methods have visibility of the type "private," for such methods there needs to be a class created that is nested within the class in which the method is declared. For methods that have public visibility, such methods can have stubs in a general container class for the stubs. Ultimately, the groups associated with the class containers for the stubs are generated.

In step 330, the list of stubs created as a result of the grouping. In step 328, it is processed as follows: in step 332, the obfuscator checks if the container for the stub methods has been created. If not, then, in step 334, the container is created based on the following: if the method is public, then a general stub container is created for the public methods; if the method is not public, then the class container is created as a nested class within the class where the method is declared. In step 336, the stub method is created. In step 338, the body of the original method is moved into the stub method, such that the original method no longer has any useful instructions in its body. In step 340, the call of the stub method is placed into the original method.

In step 342, the new metadata structure is generated, which can be written to the executable file.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. On a computer having a processor and a memory, a method of obfuscating pseudocode, the method comprising:
creating a class-container;
declaring an anonymizer method in the class-container;
identifying method call instructions in the pseudocode;
replacing, in the pseudocode, method calls with calls of the anonymizer method; and
in the anonymizer method, adding the method call instructions.

2. The method of claim 1, wherein all the added calls have the same name.

3. The method of claim 1, wherein parameter types of the added calls are replaced with an abstract type.

4. The method of claim 1, wherein return types of the added calls are replaced with an abstract type.

5. The method of claim 1, wherein the class-container is a global class.

6. The method of claim 1, wherein the global class-container includes calls to public methods.

7. The method of claim 1, wherein the class-container is a private nested class.

8. The method of claim 1, wherein the private nested class-container includes calls to private methods.

9. The method of claim 1, wherein at least some of the added calls in the anonymizer method have the same name.

10. The method of claim 1, further comprising:
identifying field load instructions in the pseudocode;
replacing, in the pseudocode, field load instructions with calls of the anonymizer method; and
in the anonymizer method, adding the field load instructions.

11. On a computer having a processor and a memory, a method of obfuscating pseudocode, the method comprising:
creating a class-container;
identifying methods that need to be stubbed;
for each identified method, declaring a stub method in the class-container;
copying bodies of the identified methods to their corresponding stub methods; and
removing the bodies from the original identified methods;
adding, to each of the identified methods, a call to its corresponding stub method.

12. The method of claim 11, wherein parameter types of the stub methods are replaced with an abstract type.

13. The method of claim 11, wherein return types of the stub methods are replaced with an abstract type.

14. A system for obfuscating pseudocode, the system comprising:
a processor, a memory coupled to the processor, and computer code loaded into the memory to implement the following:
a class-container;
an anonymizer method in the class-container;
wherein the system identifies method call instructions in the pseudocode;
wherein, in the pseudocode, method calls are replaced with calls of the anonymizer method; and
in the anonymizer method, the method call instructions that have been replaced in the pseudocode.

15. The system of claim 14, wherein parameter types of the added calls are replaced with an abstract type.

16. The system of claim 14, wherein in the pseudocode, field load instructions are replaced with calls of the anonymizer method; and
the anonymizer method includes the replaced the field load instructions.

17. A system for obfuscating pseudocode, the system comprising:
   a processor, a memory coupled to the processor, and computer code loaded into the memory to implement the following:
   a class-container;
   for each method that needs to be stubbed in original pseudocode, a stub method declared in the class-container;
   for each method that needs to be stubbed in the original pseudocode, the body of the method is moved to its corresponding stub method and removed from the original pseudocode; and
   for each method that needs to be stubbed in the original pseudocode, a call to its corresponding stub method replaces the stubbed method.

* * * * *